(12) United States Patent
Laurent

(10) Patent No.: US 6,991,061 B2
(45) Date of Patent: Jan. 31, 2006

(54) SYSTEM FOR STEERING A VEHICLE, HAVING A DEGRADED MODE IN THE EVENT OF FAILURE OF A WHEEL STEERING ACTUATOR

(75) Inventor: Daniel Laurent, Marly (CH)

(73) Assignee: Conception et Developpement Michelin S.A., Givisiez (CH)

(*) Notice: Subject to any disclaimer, the term of this patent is extended or adjusted under 35 U.S.C. 154(b) by 34 days.

(21) Appl. No.: 10/732,000

(22) Filed: Dec. 10, 2003

(65) Prior Publication Data

US 2004/0140147 A1 Jul. 22, 2004

(30) Foreign Application Priority Data

Dec. 11, 2002 (FR) .................................. 02 15880

(51) Int. Cl.
*B62D 5/04* (2006.01)
(52) U.S. Cl. ...................................... 180/402; 180/446
(58) Field of Classification Search ............... 180/402, 180/408, 409, 410, 411, 446
See application file for complete search history.

(56) References Cited

U.S. PATENT DOCUMENTS

| | | | | |
|---|---|---|---|---|
| 6,015,193 | A | 1/2000 | Vogel et al. | 303/147 |
| 6,279,674 | B1 | 8/2001 | Lissel et al. | 180/403 |
| 6,662,898 | B1 * | 12/2003 | Mattson et al. | 180/446 |
| 2004/0026158 | A1 * | 2/2004 | Rieth et al. | 180/402 |

FOREIGN PATENT DOCUMENTS

WO WO 01/72571 10/2001

* cited by examiner

*Primary Examiner*—Kevin Hurley
(74) *Attorney, Agent, or Firm*—Fitzpatrick, Cella, Harper & Scinto

(57) ABSTRACT

A system for steering a vehicle whereof steering of all the steerable wheels is controlled by an actuator specific thereto, the system having a controller which has at least a normal mode of operation in which, for each steerable wheel, the controller determines a set point for the normal steering angle and a degraded mode activated in the event of failure of a wheel actuator, in which the controller determines a compensating steering set point for a wheel.

64 Claims, 2 Drawing Sheets

SYSTEM FOR STEERING A VEHICLE, HAVING A DEGRADED MODE IN THE EVENT OF FAILURE OF A WHEEL STEERING ACTUATOR

BACKGROUND OF THE INVENTION

The present invention relates to road motor vehicles provided with a system for steering whereof steering of all the steerable wheels is controlled by an actuator specific thereto. For example, of the known electrical steering systems, there exist some which have no mechanical coupling between the steerable wheels and the steering wheel and similarly no mechanical coupling for synchronizing the steering between the steerable wheels themselves.

Electrical steering systems are known which have an individual electrical actuator for each steerable wheel, the steering system being capable of steering each of the steerable wheels selectively at an angle specific thereto, with the compatibility of the different steering actions being ensured by the steering electronics. The electrical actuator for each wheel has the function of imposing the steering angle selected by the steering electronics on the wheel in question. The steering control means available to the driver of the vehicle may be a traditional steering wheel or a lever of the joystick type or any other suitable device. The commands given by the driver of the vehicle through his or her control device are sent to the steering electronics, which is loaded with suitable programs so that the actuator or actuators can be steered appropriately.

One of the advantages of this technology is that it is ideally suited to cooperating with electronics and IT systems whereof the progress allows more and more sophisticated automatic control steps to be performed, which makes it possible for steering of the wheels to be put under the control not only of manual operation but also of a safety system. Thus, for example, it is possible to put the steerable wheels at an angle which takes account not only of operation by the driver of the vehicle but also of the observed dynamic parameters of the vehicle.

Thanks to the electrical steering, a far greater range of possibilities opens up for acting on the stability of the trajectory of a vehicle. For example, whereas at present an automatic system for correcting the trajectory of the vehicle imposes corrective yaw moments by means of the brakes of one or more wheels, going over to electrical controls of the different functions of a vehicle would make it possible to act on steering of the different steerable wheels of the vehicle to correct its trajectory.

However, the system for steering a vehicle is a vital, critical function for safety, like the brakes. Consequently, so that it can replace the mechanical steering, power-assisted or otherwise, which is used almost universally nowadays on all road vehicles, it is essential for an electrical steering system to be extremely safe. This is why electrical systems are generally designed with redundancy with the aim of ensuring that the system always remains operational even if one of its components fails. This is the concept of fault tolerant system. Thus, for example, the electrical parts of the wheel actuators are preferably redundant. In this regard, the reader is referred for example to U.S. patent application Ser. No. 2003/0098197, which gives an example of a redundant system for an electrical steering control.

However, the possibility that an essential component will fail can never be completely ruled out. For example, an electrical wheel actuator may become stuck in a certain angular position, or indeed it may undergo electrical failure so that it adopts a neutral angular position, in which case it is incapable of transmitting steering forces (or forces to maintain a straight line).

The object of the invention is therefore, in the event of complete failure of an electrical actuator acting on one of the steerable wheels, to enable control of the trajectory of the vehicle to be maintained as far as possible as its driver wishes, at least so that the vehicle can be parked in a safe place for its passengers.

SUMMARY OF THE INVENTION

The invention relates to a system for steering a vehicle whereof steering of all the steerable wheels is controlled by an actuator specific thereto, the system having at least one lever for controlling the steering available to the driver in order to affect the trajectory of the vehicle, each steerable wheel being provided with measuring means allowing the steering angle of the said steerable wheel to be estimated, the system having:

a controller which has at least a normal mode of operation in which, for each steerable wheel, the controller determines a set point for the normal steering angle at least as a function of the driver's operation of his or her control lever and having at least a degraded mode activated in the event of failure of a wheel actuator;

means for detecting the failure of a wheel actuator which activates the said degraded mode and transmits to the controller the location on the vehicle of the wheel whereof the actuator has failed;

in which system, in the degraded mode activated in the event of failure of a given wheel actuator, the controller determines at least one compensating steering set point for another steerable wheel.

It goes without saying that the steering using an electrical actuator, in response among other things to the characteristics indicated in the preamble above, provides a preferred field of application for the invention. However, this is not restrictive, since hydraulic steering systems may also be constructed in accordance with the proposals of the invention.

A wheel actuator acts, by controlling the steering angle of the steerable wheel to which it is connected, to impose a certain amount of yaw torque on the vehicle. When a wheel actuator fails, in accordance with the invention this amount of yaw torque is imposed by causing the steering to act on another wheel or where appropriate a plurality of other wheels and in addition, eventually, on the motor and/or braking torque of the one or the other of the wheels, including where appropriate a plurality thereof, including where appropriate the wheel whereof the steering actuator has failed. The controller determines one or more appropriate compensating steering set points, by itself or by interacting with a module for monitoring the stability of the vehicle. For example, the compensating steering set point relates to the opposing steerable wheel on the axle having a failed steerable wheel.

It is known that the lateral force of a tire depends primarily on the sideslip angle of this tire. In the context of the present invention the term "tire" covers equally an inflated tire or a non-pneumatic tire or any object forming a hybrid of these two concepts. It is also known that the stability of a vehicle's trajectory depends principally on the transverse force that develops at each of its axles. In the case of a passenger vehicle with four wheels, or in other words two axles, as the transverse force of one of the axles is modified with respect to the transverse force of the other axle the vehicle will adopt a yaw angle. Whether to keep the vehicle in a straight line or to make it turn, or whether to keep it on its trajectory despite outside influences such as a cross wind, through the steering of the wheels, the aim is always to cause each of the axles, front and rear, of this vehicle to develop transverse forces corresponding to the operations by the driver in order to impose on the vehicle a certain amount of yaw torque.

On each axle the total transverse force corresponds to the sum of the transverse forces developed by each of the tires. If one of the electrical actuators has failed, it is no longer possible to rely on the tire of the steerable wheel in question in order to develop a selected transverse force. And the dynamic equilibrium of the vehicle is all the more important for safety the faster the vehicle is travelling. It is noted that, on travel at high speed, the steering angles of the wheels are always relatively small.

The invention proposes, should a failure occur in one of the steerable wheel actuators of an axle, to compensate by modifying the steering angle acting on the steerable wheel, for example the opposite steerable wheel on the same axle, in the desired direction. As a complementary measure, the invention also proposes affecting the yaw movement in the event of failure of one of the steerable wheel actuators by imposing different amounts of torque on the wheels of at least one axle, as is well known per se in those systems for controlling the stability of vehicles which are known as ESP.

It goes without saying that what is proposed above provides only a degraded mode which is to be used only as a last resort when the system, which will preferably have redundancy built into its control paths, has become incapable of transmitting to one of the steerable wheels steering angles corresponding either to those desired by the driver or to what is calculated by an electronic system for managing the trajectory of the vehicle.

The degraded mode management proposed by the invention provides a solution which allows the dynamic equilibrium of the vehicle to be maintained, however only within the limits that are physically possible for this vehicle. Thus, provided the lateral force of the tire of the steerable wheel whereof the electrical actuator has not failed have not reached its saturation point, it is possible to modify the steering angle of said steerable wheel such that the transverse force that will be developed by said steerable wheel tends to create an overall transverse force of the axle in question which corresponds to that necessary for ensuring the vehicle's equilibrium—that is to say the sum of the transverse forces that the two steerable wheels of the axle would have developed in the normal mode of operation.

It goes without saying that on the failed steerable wheel the transverse force corresponding to the steering angle of this wheel may be the opposite of the transverse force desired on the axle in question. It goes without saying that adopting a compensation for the operative wheel as explained here may entail a longitudinal braking force. However, the objective of this degraded mode is not to provide the vehicle with the same capacity for travel but simply to enable it to be driven further even in the event of the complete failure of an important element so that it can be slowed down or stopped in the safest possible conditions, taking into account the situation of the vehicle.

BRIEF DESCRIPTION OF THE DRAWINGS

The invention is illustrated by way of the two attached drawings, in which.

DETAILED DESCRIPTION OF THE INVENTION

Figure 1:
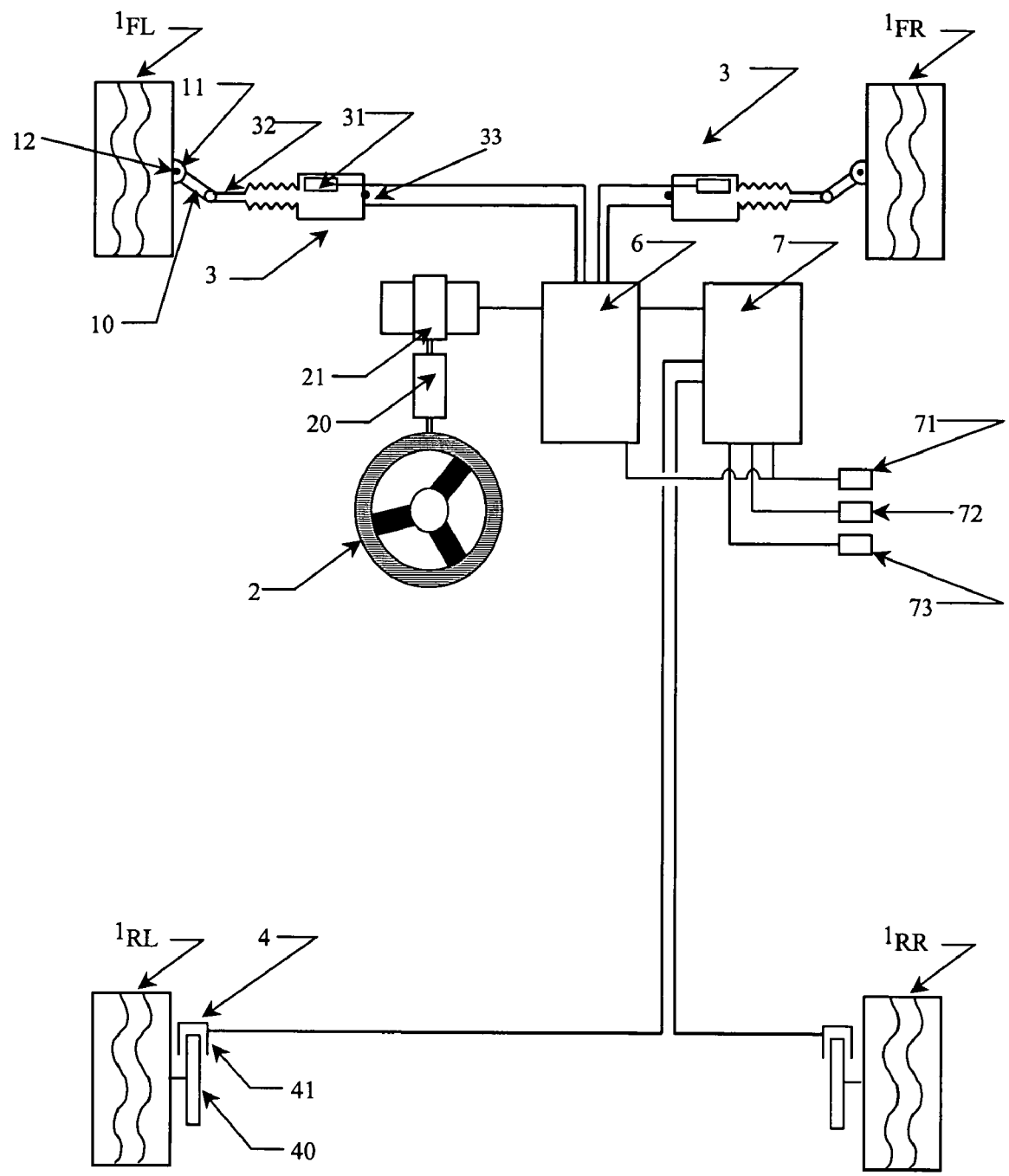
FIG. 1 shows a diagram of the installation of an electrical steering system in a four-wheeled vehicle in which only the front axle is a steerable axle.

FIG. 1 illustrates diagrammatically a vehicle having four wheels $1_{FL}$, $1_{FR}$, $1_{RL}$ and $1_{RR}$, whereof the front axle has two steerable wheels. The wheels are designated $1_{RL}$ in the case of the front left wheel, $1_{FR}$ in the case of the front right wheel, $1_{RL}$ in the case of the rear left wheel and $1_{RR}$ in the case of the rear right wheel. The steerable wheels are mounted on a wheel carrier 11 and steered about the axis 12. A lever 10 for steering control is mounted in a manner integrally fixed to the wheel carrier 11. To simplify this drawing, two steerable wheels and two wheels with brakes have been shown, but it will be understood that all the wheels may be steerable wheels, all the wheels may of course be equipped with brakes, and at least two wheels or even all four wheels may be driving wheels.

Each steerable wheel is steered by an electrical actuator 3 connected on the one hand to the body or chassis 33 of the vehicle and on the other to the lever 10 in order to control the steering angle of the wheel 1 in question. Each actuator has for example an electric revolving cylinder motor 30, a nut and bolt device (not illustrated) and a sliding rod 32 which is in turn connected to the lever 10 for steering control. Each actuator also has a sensor 31 for detecting the position of the rod 32, which operates independently of the electric motor of the actuator. This position sensor 31 allows the exact position of the sliding rod to be measured and, by geometric calculation, the exact angular position of the steerable wheel in question to be established.

Also visible is a steering wheel 2 which is connected to a device 20 for returning to straight-line travel and to a device for measuring the angle of the steering wheel 21.

A controller 6 allows steering of the steerable wheels to be directed as a function of various parameters, including of course the angle of the steering wheel (or the position of an equivalent member) and the speed of the vehicle. The controller 6 is loaded with suitable programs for calculating an appropriate steering angle for each of the steerable wheels at any moment, and drives the electrical actuator 3 of each of the steerable wheels.

Figure 2:
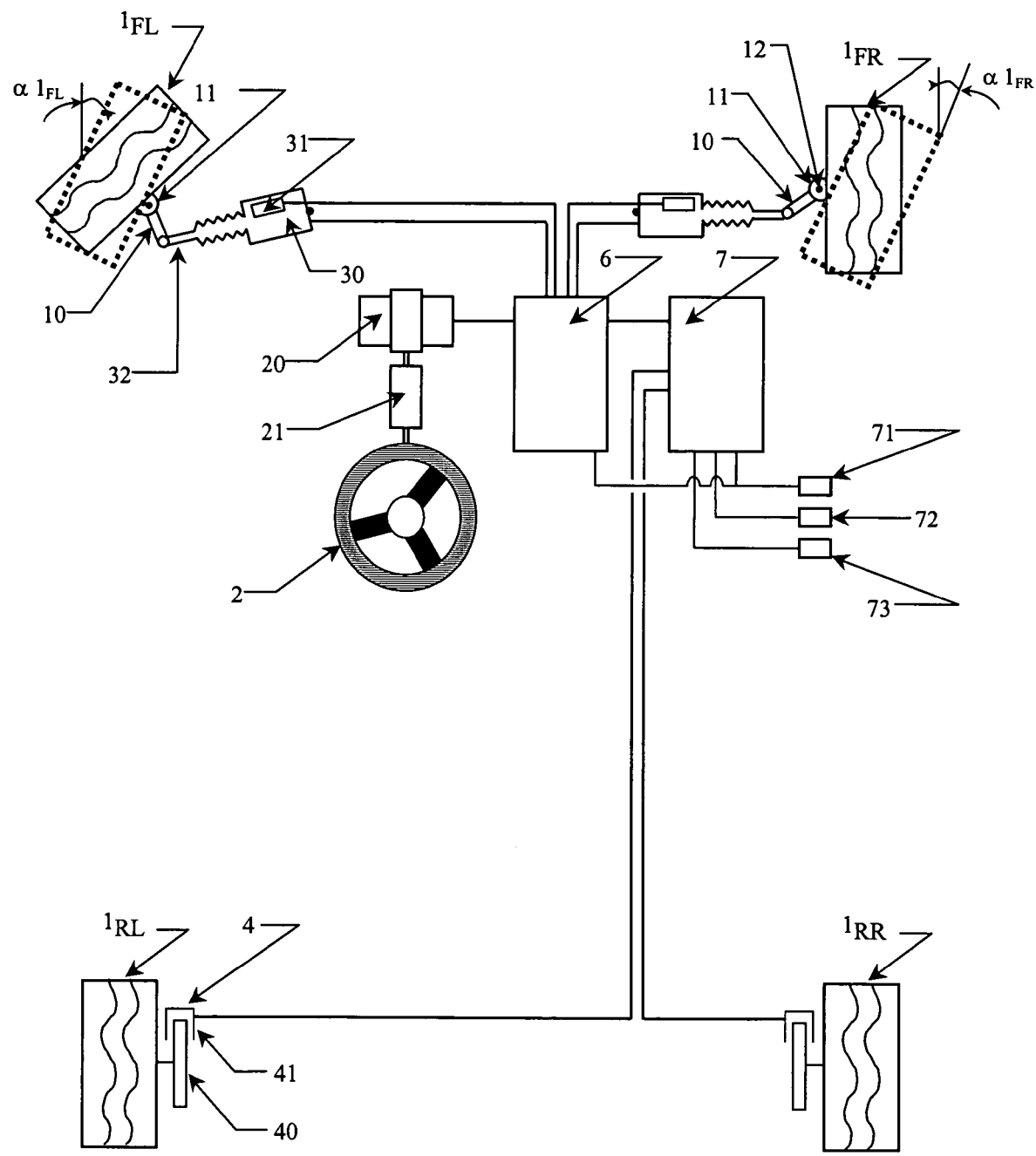
FIG. 2 shows the situation of this vehicle in the degraded mode.

In FIGS. 1 and 2, also illustrated (only at the rear, in order not to make the drawings over-loaded) and associated with each of the wheels are a brake disc 40 and a brake caliper 41. Here, the brakes are only of interest to the extent that they may intervene in the degraded mode.

A module 7 for controlling the trajectory stability allows any wheel of the vehicle to be subject to braking selectively and independently, as is well known per se. This module analyses the signals coming from the controller 6 and from sensors such as a vehicle speed sensor 71, a transverse acceleration sensor 72 and a yaw sensor 73, this list being neither defining nor exhaustive.

FIG. 2 illustrates a situation in which the vehicle has to turn to the right and the actuator of the front right wheel (inside wheel in the turn) has failed, being stuck in the straight-line position. The controller calculates a normal steering angles a 1FL and a 1FR for each of the steerable wheels. The angular positions that the wheels would have, should they be capable of matching the normal steering angles a $1_{FL}$ and a $1_{FR}$, are shown in broken lines. It is seen that the front right wheel remains in the straight-line position. The controller 6 determines a compensating steering set point for the front left wheel such that the front left wheel is steered as shown in solid lines. In this situation, the front left wheel will develop a substantial lateral force. This transverse force is oriented towards the right-hand side of the vehicle.

As the front right wheel is assumed to remain in the straight-line position in this hypothesis, this will be accompanied by a lateral force developed by the front right wheel and pointing in the opposite direction, that is to say towards the left-hand side of the vehicle. The algebraic addition of the two opposing transverse forces together gives a resulting transverse force which is, however, still oriented towards the right. The existence of this transverse force will bring about steering of the vehicle to the right.

In the case in point, the transverse load transfer is all the greater especially if the vehicle is travelling at high speed. Consequently, the contribution to the overall transverse force of the front axle is in any case principally determined by the transverse force of the front left wheel, the most loaded wheel, which is on the outside as the vehicle turns. This is a relatively favorable situation in which the degraded mode allows a good dynamic equilibrium of the vehicle to be maintained.

In the reverse hypothesis, in which the failed electrical actuator corresponds to the outside wheel as the vehicle turns, taking into account the load transfer which was explained above, the compensating angular set point for the opposite steerable wheel must be that much greater. However, taking into account the fact that the tire in question is relieved of load, the saturation point of the transverse force of which the tire in question is capable can be expected to occur much more quickly. However, the management of the degraded mode proposed by the invention still allows the vehicle to be kept in much safer conditions than would arise in the absence of compensation. Moreover, and preferably, in the case in point (with failure of the actuator of the front wheel on the outside as the vehicle turns) the system moreover actuates, by way of the module 7 for controlling the trajectory stability, the brake of at least one wheel of the vehicle on the side of the vehicle towards which the driver wants to orient the yaw movement in accordance with his or her operation of the control lever.

It should also be pointed out that it is desirable, as a result of the design of the vehicle and/or the way it is fine tuned, in the event of the electrical failure of an actuator without mechanical sticking thereof, for the steerable wheel to be capable of being steered relatively freely in order to avoid the risk of developing transverse forces opposed to the transverse forces developed by the steerable wheel having the operative actuator. To this end, namely, the electrical actuator is preferably reversible. Moreover, the suspension is set up in such a way that torque (engine or braking) on the wheel brings about only small amounts of steering if any (thanks for instance to a suspension design having the pivot axis of the wheel comprised in the wheel middle plane, a design known as "pivot in axis", or thanks to a caster angle and/or kingpin offset minimal or zero).

Finally, it should be pointed out that in cases where there is torque on the wheels it may be advantageous to apply engine torque to one and/or the other of the wheels which are on the outside as the vehicle turns, however only temporarily. Finally, in the event of the actuator of a wheel failing to operate, it is preferably advantageous to bring about overall slowing of the vehicle and hence to limit its speed.

In a particular example, the value of the compensating steering set point depends on the difference, both as regards size and sign, between the normal steering angle which is calculated and the steering angle measured on the steerable wheel whereof the actuator has failed.

In another particular example, the compensating steering set point depends on the location of the wheel whereof the actuator has failed, the location being either on the left-hand side of the vehicle or on the right-hand side of the vehicle, in relation to the yaw movement of the vehicle oriented either to the left or to the right.

In another particular example, when the degraded mode is activated on failure of a single wheel actuator of a given axle, compensating comprises in addition a braking set point of at least one wheel of the vehicle on the side of the vehicle towards which the driver wants to orient the vehicle in accordance with his or her operation of the control lever.

In another particular example, when the actuator of the front wheel on the inside as the vehicle turns fails, the compensating steering set point is a steering angle which corresponds to a same-sign fraction of the normal steering angle calculated for the steerable wheel whereof the actuator has not failed.

In another particular example, when the actuator of the front wheel on the outside as the vehicle turns fails, the compensating steering set point is a steering angle which corresponds substantially to the normal steering angle calculated for the steerable wheel whereof the actuator has not failed, with the system moreover actuating the brake of at least one wheel of the vehicle on the side of the vehicle towards which the driver wants to orient the vehicle in accordance with his or her operation of the control lever.

What is claimed is:

1. A system for steering a vehicle whereof steering of all the steetable wheels is controlled by an actuator specific thereto, the system having at least one lever for controlling the steering available to the driver in order to affect the trajectory of the vehicle, each steerable wheel being provided with measuring means allowing the steering angle of the said steerable wheel to be estimated, the system having:

a controller which has at least a normal mode of operation in which, for each steerable wheel, the controller determines a set point for the normal steering angle at least as a function of the driver's operation of his or her control lever and having at least a degraded mode activated in the event of failure of a wheel actuator; and means for detecting the failure of a wheel actuator which activates the said degraded mode and transmits to the controller the location on the vehicle of the wheel whereof the actuator has failed, wherein, in the degraded mode activated in the event of failure of a given wheel actuator, the controller determines at least one compensating steering set point for another steerable wheel, and the value of the compensating steering set point depends on the difference, both as regards size and sign, between the normal steering angle which is calculated and the steering angle measured on the steerable wheel whereof the actuator has failed.

2. A steering system according to claim 1, in which the compensating steering set point relates to the opposing steerable wheel on the axle having a failed steerable wheel.

3. A steering system according to claim 1, in which the compensating steering set point depends on the location of the wheel whereof the actuator has failed, the location being either on the left-hand side of the vehicle or on the right-hand side of the vehicle, in relation to the yaw movement of the vehicle oriented either to the left or to the right.

4. A steering system according to claim 1, in which the compensating steering set point depends on the location of the wheel whereof the actuator has failed, the location being either on the left-hand side of the vehicle or on the right-hand side of the vehicle, in relation to the yaw movement of the vehicle oriented either to the left or to the right.

5. A steering system according to claim 1, in which, when the degraded mode is activated on failure of a single wheel actuator of a given axle, the controller determines in addition one compensating braking set point of at least one wheel of the vehicle on the side of the vehicle towards which the driver wants to orient the vehicle in accordance with his or her operation of the steering control lever.

6. A steering system according to claim 1, in which, when the degraded mode is activated on failure of a single wheel actuator of a given axle, the controller determines in addition one compensating braking set point of at least one wheel of the vehicle on the side of the vehicle towards which the driver wants to orient the vehicle in accordance with his or her operation of the steering control lever.

7. A steering system according to claim 3, in which, when the degraded mode is activated on failure of a single wheel actuator of a given axle, the controller determines in addition one compensating braking set point of at least one wheel of the vehicle on the side of the vehicle towards which the driver wants to orient the vehicle in accordance with his or her operation of the steering control lever.

8. A steering system according to claim 4, in which, when the degraded mode is activated on failure of a single wheel actuator of a given axle, the controller determines in addition one compensating braking set point of at least one wheel of the vehicle on the side of the vehicle towards which the driver wants to orient the vehicle in accordance with his or her operation of the steering control lever.

9. A steering system according to claim 1, in which, when the actuator of the front wheel on the inside as the vehicle turns fails, the compensating steering set point is a steering angle which corresponds to a same-sign fraction of the normal steering angle calculated for the steerable wheel whereof the actuator has not failed.

10. A steering system according to claim 1, in which, when the actuator of the front wheel on the inside as the vehicle turns fails, the compensating steering set point is a steering angle which corresponds to a same-sign fraction of the normal steering angle calculated for the steering wheel whereof the actuator has not failed.

11. A steering system according to 3, in which, when the actuator of the front wheel on the inside as the vehicle turns fails, the compensating steering set point is a angle which corresponds to a same-sign fraction of the normal steering angle calculated for the steerable wheel whereof the actuator has not failed.

12. A steering system according to claim 4, in which, when the actuator of the front wheel on the inside as the vehicle turns fails, the compensating steering set point is a steering angle which corresponds to a same-sign fraction of the normal steering angle calculated for the steerable wheel whereof the actuator has not failed.

13. A steering system according to claim 5, in which, when the actuator of the front wheel on the inside as the vehicle turns fails, the compensating steering set point is a steering angle which corresponds to a same-sign fraction of the normal steering angle calculated for the steerable wheel whereof the actuator has not failed.

14. A steering system according to claim 6, in which, when the actuator of the front wheel on the inside as the vehicle turns fails, the compensating steering set point is a steering angle which corresponds to a same-sign fraction of the normal steering angle calculated for the steerable wheel whereof the actuator has not failed.

15. A steering system according to claim 7, in which, when the actuator of the front wheel on the inside as the vehicle turns fails, the compensating steering set point is a steering angle which corresponds to a same-sign fraction of the normal steering angle calculated for the steerable wheel whereof the actuator has not failed.

16. A steering system according to claim 8, in which, when the actuator of the front wheel on the inside as the vehicle turns fails, the compensating steering set point is a steering angle which corresponds to a same-sign fraction of the normal steering angle calculated for the steerable wheel whereof the actuator has not failed.

17. A steering system according to claim 1, in which, when the actuator of the front wheel on the outside as the vehicle turns fails, the compensating steering set point is a steering angle which corresponds substantially to the normal steering angle calculated for the steerable wheel whereof the actuator has not failed, with the system moreover actuating the brake of at least one wheel of the vehicle on the side of the vehicle towards which the driver wants to orient the vehicle in accordance with his or her operation of the control lever.

18. A steering system according to claim 1, in which, when the actuator of the front wheel on the outside as the vehicle turns fails, the compensating steering set point is a steering angle which corresponds substantially to the normal steering angle calculated for the steerable wheel whereof the actuator has not failed, with the system moreover actuating the brake of at least one wheel of the vehicle on the side of the vehicle towards which the driver wants to orient the vehicle in accordance with his or her operation of the control lever.

19. A steering system according to claim 3, in which, when the actuator of the front wheel on the outside as the vehicle turns fails, the compensating steering set point is at steering angle which corresponds substantially to the normal steering angle calculated for the steerable wheel whereof the actuator has not failed, with the system moreover actuating the brake of at least one wheel of the vehicle on the side of the vehicle towards which the driver wants to orient the vehicle in accordance with his or her operation of the control lever.

20. A steering system according to claim 4, in which, when the actuator of the front wheel on the outside as the vehicle turns fails, the compensating steering set point is a steering angle which corresponds substantially to the normal steering angle calculated for the steerable wheel whereof the actuator has not failed, with the system moreover actuating the brake of at least one wheel of the vehicle on the side of the vehicle towards which the driver wants to orient the vehicle in accordance with his or her operation of the control lever.

21. A steering system according to claim 5, in which, when the actuator of the front wheel on the outside the vehicle turns fails, the compensating steering set point is a steering angle which corresponds substantially to the normal steering angle calculated for the steerable wheel whereof the actuator has not failed, with the system moreover actuating the brake of at least one wheel of the vehicle on the side of the vehicle towards which the driver wants to orient the vehicle in accordance with his or her operation of the control lever.

22. A steering system according to claim 6, in which, when the actuator of the front wheel on the outside as the vehicle turns fails, the compensating steering set point is a steering angle which corresponds substantially to the normal steering angle calculated for the steering wheel whereof the actuator has not failed, with the system moreover actuating the brake of at least one wheel of the vehicle on the side of the vehicle towards which the driver wants to orient the vehicle in accordance with his or her operation of the control lever.

23. A steering system according to claim 7, in which, when the actuator of the front wheel on the outside as the vehicle turns fails, the compensating steering set point is a steering angle which corresponds substantially to the normal steering angle calculated for the steerable wheel whereof the actuator has not failed, with the system moreover actuating the brake of at least one wheel of the vehicle on the side of the vehicle towards which the driver wants to orient the vehicle in accordance with his or her operation of the control lever.

24. A steering system according to claim 8, in which, when the actuator of the front wheel on the outside of the vehicle turns fails, the compensating steering set point is a steering angle which corresponds substantially to the normal steering angle calculated for the steerable wheel whereof the actuator has not failed, with the system moreover actuating the brake of at least one wheel of the vehicle on the side of the vehicle towards which the driver wants to orient the vehicle in accordance with his or her operation of the control lever.

25. A steering system according to claim 9, in which, when the actuator of the front wheel on the outside as the vehicle turns fails, the compensating steering set point is a steering angle which corresponds substantially to the normal steering angle calculated for the steerable wheel whereof the actuator has not failed, with the system moreover actuating the brake of at least one wheel of the vehicle on the side of the vehicle towards which the driver wants to orient the vehicle in accordance with his or her operation of the control lever.

26. A steering system according to claim 10, in which, when the actuator of the front wheel on the outside as the vehicle turns fails, the compensating steering set point is a steering angle which corresponds substantially to the normal steering angle calculated for the steerable wheel whereof the actuator has not failed, with the system moreover actuating the brake of at least one wheel of the vehicle on the side of the vehicle towards which the driver wants to orient the vehicle in accordance with his or her operation of the control lever.

27. A steering system according to claim 11, in which, when the actuator of the front wheel on the outside as the vehicle turns fails, the compensating steering set point is a steering angle which corresponds substantially to the normal steering angle calculated for the steerable wheel whereof the actuator has not failed, with the system moreover actuating the brake of at least one wheel of the vehicle on the side of the vehicle towards which the driver wants to orient the vehicle in accordance with his or her operation of the control lever.

28. A steering system according to claim 12, in which, when the actuator of the front wheel on the outside as the vehicle turns fails, the compensating steering set point is a steering angle which corresponds substantially to the normal steering angle calculated for the steerable wheel whereof the actuator has not failed, with the system moreover actuating the brake of at least one wheel of the vehicle on the side of the vehicle towards which the driver wants to orient the vehicle in accordance with his or her operation of the control lever.

29. A steering system according to claim 13, in which, when the actuator of the front wheel on the outside the vehicle turns fails, the compensating steering set point is a steering angle which corresponds substantially to the normal steering angle calculated for the steerable wheel whereof the actuator has not failed, with the system moreover actuating the brake of at least one wheel of the vehicle on the side of the vehicle towards which the driver wants to orient the vehicle in accordance with his or her operation of the control lever.

30. A steering system according to claim 14, in which, when the actuator of the front wheel on the outside as the vehicle turns fails, the compensating steering set point is a steering angle which corresponds substantially to the normal steering angle calculated for the steerable wheel whereof the actuator has not failed, with the system moreover actuating the brake of at least one wheel of the vehicle on the side of the vehicle towards which the driver wants to orient the vehicle in accordance with his or her operation of the control lever.

31. A steering system according to claim 15, in which, when the actuator of the front wheel on the outside as the vehicle turns fails, the compensating steering set point is a steering angle which corresponds substantially to the normal steering angle calculated for the steerable wheel whereof the actuator has not failed, with the system moreover actuating the brake of at least one wheel of the vehicle on the side of the vehicle towards which the driver wants to orient the vehicle in accordance with his or her operation of the control lever.

32. A steering system according to claim 16, in which, when the actuator of the front wheel on the outside as the vehicle turns fails, the compensating steering set point is a steering angle which corresponds substantially to the normal steering angle calculated for the steerable wheel whereof the actuator has not failed, with the system moreover actuating the brake of at least one wheel of the vehicle on the side of the vehicle towards which the driver wants to orient the vehicle in accordance with his or her operation of the control lever.

33. A steering system according to claim 1, in which the wheel actuators are electrical.

34. A steering system according to claim 1, in which the wheel actuators are electrical.

35. A steering system according to claim 3, in which the wheel actuators are electrical.

36. A steering system according to claim 4, in which the wheel actuators are electrical.

37. A steering system according to claim 5, in which the wheel actuators are electrical.

38. A steering system according to claim 6, in which the wheel actuators are electrical.

39. A steering system according to claim 7, in which the wheel actuators are electrical.

40. A steering system according to claim 8, in which the wheel actuators are electrical.

41. A steering system according to claim 9, in which the wheel actuators are electrical.

42. A steering system according to claim 10, in which the wheel actuators are electrical.

43. A steering system according to claim 11, in which the wheel actuators are electrical.

44. A steering system according to claim 12, in which the wheel actuators are electrical.

45. A steering system according to claim 13, in which the wheel actuators are electrical.

46. A steering system according to claim 14, in which the wheel actuators are electrical.

47. A steering system according to claim 15, in which the wheel actuators are electrical.

48. A steering system according to claim 16, in which the wheel actuators are electrical.

49. A steering system according to claim 17, in which the wheel actuators are electrical.

50. A steering system according to claim 18, in which the wheel actuators are electrical.

51. A steering system according to claim 19, in which the wheel actuators are electrical.

52. A steering system according to claim 20, in which the wheel actuators are electrical.

53. A steering system according to claim 21, in which the wheel actuators are electrical.

54. A steering system according to claim 22, in which the wheel actuators are electrical.

55. A steering system according to claim 23, in which the wheel actuators are electrical.

56. A steering system according to claim 24, in which the wheel actuators are electrical.

57. A steering system according to claim 25, in which the wheel actuators are electrical.

58. A steering system according to claim 26, in which the wheel actuators are electrical.

59. A steering system according to claim 27, in which the wheel actuators are electrical.

60. A steering system according to claim 28, in which the wheel actuators are electrical.

61. A steering system according to claim 29, in which the wheel actuators are electrical.

62. A steering system according to claim 30, in which the wheel actuators are electrical.

63. A steering system according to claim 31, in which the wheel actuators are electrical.

64. A steering system according to claim 32, in which the wheel actuators are electrical.

* * * * *

UNITED STATES PATENT AND TRADEMARK OFFICE
CERTIFICATE OF CORRECTION

PATENT NO. : 6,991,061 B2  
APPLICATION NO. : 10/732000  
DATED : January 31, 2006  
INVENTOR(S) : Daniel Laurent Page 1 of 1

It is certified that error appears in the above-identified patent and that said Letters Patent is hereby corrected as shown below:

COLUMN 4

Line 12, "$1_{RL}$" should read --$1_{FL}$--;  
Line 64, "a1FL and a 1FR" should read --$\propto 1_{FL}$ and $\propto 1_{FR}$--; and  
Line 64, "a1FL and a 1FR," should read --$\propto 1_{FL}$ and $\propto 1_{FR}$,--.

COLUMN 7

Line 47, "steering" should read --steerable--;  
Line 50, "3," should read --claim 3,--; and  
Line 52, "a angle" should read --a steering angle--.

COLUMN 8

Line 42, "at" should read --a--; and  
Line 62, "outside" should read --outside as--.

COLUMN 10

Line 8, "outside" should read --outside as--; and  
Line 49, "claim 1," should read --claim 2,--.

Signed and Sealed this

Thirty-first Day of July, 2007

JON W. DUDAS  
*Director of the United States Patent and Trademark Office*